(12) United States Patent
Usui

(10) Patent No.: US 7,218,578 B2
(45) Date of Patent: May 15, 2007

(54) REPRODUCING APPARATUS, OPERATING APPARATUS FOR REPRODUCING AND REPRODUCING METHOD THEREFOR

(75) Inventor: Syunji Usui, Fukushima (JP)

(73) Assignee: D&M Holdings Inc., Kawasaki-shi, Kanagawa (JP)

( * ) Notice: Subject to any disclaimer, the term of this patent is extended or adjusted under 35 U.S.C. 154(b) by 605 days.

(21) Appl. No.: 10/799,637

(22) Filed: Mar. 15, 2004

(65) Prior Publication Data
US 2005/0068867 A1 Mar. 31, 2005

(30) Foreign Application Priority Data
Sep. 30, 2003 (JP) ............................. 2003-341221
Nov. 18, 2003 (JP) ............................. 2003-387843
Jan. 28, 2004 (JP) ............................. 2004-020169

(51) Int. Cl.
*G11B 21/08* (2006.01)
*G11B 19/02* (2006.01)

(52) U.S. Cl. .............................. 369/30.27; 369/47.32; 369/47.42

(58) Field of Classification Search ............. 369/30.26, 369/30.36, 47.32, 47.34; 84/605, 743, 600, 84/723
See application file for complete search history.

(56) References Cited

U.S. PATENT DOCUMENTS

| 6,434,100 B1 | 8/2002 | Usui |
| 2003/0165100 A1* | 9/2003 | Kikuchi ..................... 369/53.3 |
| 2005/0052981 A1* | 3/2005 | Shim et al. .............. 369/59.26 |

FOREIGN PATENT DOCUMENTS

| JP | 6-89501 | 3/1994 |
| JP | 2004-79113 A | 3/2004 |
| WO | WO 97/01168 | 1/1997 |

\* cited by examiner

*Primary Examiner*—Wayne Young
*Assistant Examiner*—Latanya Bibbins
(74) *Attorney, Agent, or Firm*—Dickstein Shapiro LLP

(57) ABSTRACT

The control section determines the rotational direction and the rotational speed of the operation discal unit based on the first pulse signal from the first optical sensor section. When determines that the operation discal unit starts rotating in the reference rotational direction after a pause of at least predetermined period of time, the control section controls the motor to rotate the discal unit temporarily at a speed higher than the reference rotational speed.

6 Claims, 5 Drawing Sheets

RELATED ART

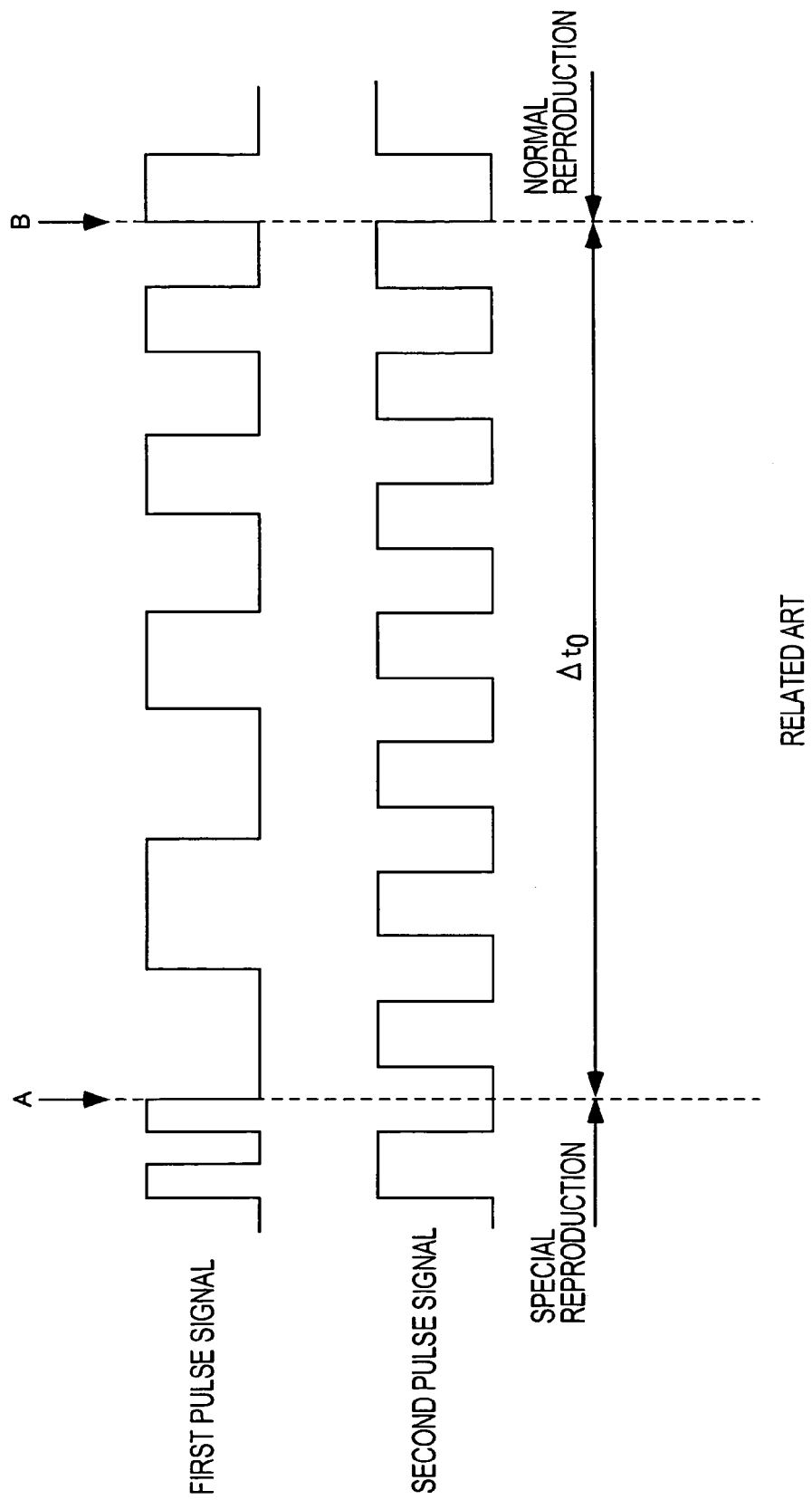

REPRODUCING APPARATUS, OPERATING APPARATUS FOR REPRODUCING AND REPRODUCING METHOD THEREFOR

BACKGROUND

The present invention relates to a reproducing apparatus, an operating apparatus for reproducing, and a reproducing method therefor, which are capable of reproducing data recorded in a recording medium as desired by a user.

A user, for example a "Disc Jockey", referred to as "DJ" hereinafter, who manipulates an audio reproducing apparatus and reproduces analogue audio data, often performs a special reproduction, so-called "scratch reproduction", in the process of replaying an analogue record. The scratch reproduction is a specialized reproducing technique which generates an effective sound like a scratch sound. When the user performs the scratch reproduction by use of the analogue record, this kind of scratch sound is generated by turning the analogue record rapidly in forward direction and in reverse direction.

There is also a CD player, which is capable of performing a special reproduction as to the digital audio data recorded on CD (Compact Disc), similar to the scratch reproduction by use of the analogue record player. This type of CD player includes a jog dial and a memory, the audio data read from a CD is stored in the memory, and then the stored audio data is reproduced. The user turns the jog dial in forward direction and in reverse direction, similar to the case of analogue record, thereby changing the speed and sequence for reading the audio data stored in the memory. With such manipulations, the user can perform a special reproduction such as scratch reproduction, even on a CD, which is similar to the scratch reproduction performed by use of an analogue record (for example, see the Unexamined Japanese Patent Laid-open KOKAI Publication No. H06-089501).

Specifically, this type of CD player reads the audio data stored in the memory at a normal speed and in a normal sequence (hereinafter, referred to as "normal reproduction"), in a state that the jog dial is not manipulated. When the jog dial is manipulated in rotating manner, the CD player reads the audio data stored in the memory with changing the reading speed and the reading sequence in accordance with the rotational speed and rotational direction of the jog dial (hereinafter, referred to as "special reproduction").

The applicant of the present application has filed a patent application regarding an optical disc reproducing apparatus, which includes an operating section that is configured by mounting an operation discal unit on a discal unit being driven to rotate by a motor and the like (Japanese Patent Application No. 2002-240443, filed on Aug. 21, 2003). FIG. 5 shows a configuration of the optical disc reproducing apparatus 140' which is described in the specification of the above patent application. In the operating section 140' as shown in FIG. 5, an operation discal unit 28' is mounted on the discal unit 25' via a sheet section 27' having a low friction property.

The rotational speed and the rotational direction of the discal unit 25' are determined based on an output from the second optical sensor section 32'. The rotational speed and the rotational direction of the operation discal unit 28' are determined based on an output from the first optical sensor section 31'. The discal unit 25' is rotated in a reference rotational direction (for example in clockwise direction) at a reference rotational speed (for example, at a rotational speed of an analogue record). At the time of the normal reproduction, the operation discal unit 28' is rotated at the same speed and in the same direction as those for the discal unit 25'.

At the time of special reproduction, that is, when the operation discal unit 28' is manipulated in rotating manner by a user's hand, the operation discal unit 28' is rotated at a speed and/or in a direction being different from those for the discal unit 25'. At this moment, the control section of the optical disc reproducing apparatus determines the rotational direction and the rotational speed of the operation discal unit 28' based on the output from the first optical sensor section 31', and controls the sequence and the speed for reading the audio data stored in the memory, in accordance with thus determined rotational direction and the rotational speed.

After the special reproduction is completed, the operation discal unit 28', which the user's hand has been moved off, starts to follow the rotation of the discal unit 25', and after a while, it rotates at the reference rotational speed and in the reference rotational direction in sync with the discal unit 25'. At this moment, the control section determines that the operation discal unit 28' is rotating at the reference rotational speed and in the reference rotational direction, which are same as those for the discal unit 25', and then, the normal reproduction is restarted. In this manner, this optical disc reproducing apparatus provides a data reproduction (normal reproduction and special reproduction) desired by the user.

As described above, the optical disc reproducing apparatus repeats the normal operation and the special operation, in accordance with the manipulation by the user. However, in this conventional optical disc reproducing apparatus, there may be cases where a time required for returning to the normal reproduction from the special reproduction is relatively long. FIG. 6 shows the first pulse signals outputted from the first optical sensor section 31' and the second pulse signals outputted from the second optical sensor section 32', from the time when the special reproduction is completed until the time when the normal reproduction is restarted.

As shown in FIG. 6, from the time (A) when the special reproduction is completed, the operation discal unit 28' pauses for a while until the user's hand actually moves off the operation discal unit 28', subsequently, the operation discal unit 28' slides on the sheet section 27' and starts following the rotation of the discal unit 25' by gradually increasing the rotational speed. Then, the first optical sensor 31' outputs the first pulse signals gradually at shorter intervals in accordance with the increase of the rotational speed of the operation discal unit 28', as shown in FIG. 6. When the rotation of the operation discal unit 28' agrees with that of the discal unit 25', the first optical sensor section 31' outputs the first pulse signal which has the same width as that of the second pulse signal, which indicates the reference rotational speed and the reference rotational direction. At the time (B) when it is determined that the operation discal unit 28' and the discal unit 25' are rotating at the same speed and in the same direction, according to the first pulse signal and the second pulse signal, the control section gives a control to perform the normal reproduction. Therefore, as shown in FIG. 6, the time $\Delta t_0$ is required between the timing (A) when the special reproduction is completed to the timing (B) when the normal reproduction is restarted.

Usually, when the user completes the special reproduction and restarts the normal reproduction, he or she moves one's hand off the operation discal unit 28', keeping pace with the timing (tempo) of a music tone to be reproduced, after the special reproduction status. Since the user would like to restart the normal reproduction to keep pace with the tempo of the music, he or she is required to complete the manipulation (scratch) at a timing earlier than the timing when the normal reproduction is desired to be restarted, considering the time necessary from the end of the special reproduction until restarting the normal reproduction. Therefore, there may be a case where it is hard to restart the normal reproduction with keeping pace with the tempo of the music if the time $\Delta t_0$ from the end of the special reproduction until restarting the normal reproduction is relatively long. Consequently, there is a possibility that a user, in particular DJ and the like, who is strongly sensitive to music, may not be fully satisfied with the situation above.

SUMMARY

As thus described, conventionally, there has been a demand for a data reproducing apparatus, in which a time from the end of the special reproduction until restarting the normal reproduction is made as short as possible, thereby giving a full satisfaction to a user.

In view of the above situation, the present invention helps to provide a reproducing apparatus, an operating apparatus for reproducing and a reproducing method therefor which are capable of giving a full satisfaction to the user.

The present invention further helps to provide a reproducing apparatus, an operating apparatus for reproducing and a reproducing method therefor, in which a time from the end of special reproduction of data until restarting the normal reproduction is shortened effectively.

In order to achieve the above objectives, the reproducing apparatus relating to the first viewpoint of the present invention includes, a reading section which reads data recorded on a recording medium, a storing section which stores the data read by the reading section, a reproducing section which reads out and reproduces the data stored in the storing section, a discal unit which is rotated by a driving section at a reference rotational speed and in a reference rotational direction, which are predefined, an operation discal unit which is mounted on the discal unit, being rotatable with the discal unit, and is configured in such a manner as rotatable in a rotational direction and at a rotational speed as desired by a user, so that the reproducing section performs a desired data reproduction, a sensor section which outputs a pulse signal according to the rotational direction and the rotational speed of the operation discal unit, and a control section which determines the rotational direction and rotational speed of the operation discal unit according to the pulse signal from the sensor section, and when it is determined that the operation discal unit starts rotating in the reference direction after a state of pausing for at least a predefined period of time, the control section controls the driving section so that the discal unit is rotated at a speed higher than the reference rotational speed, for a predetermined period of time.

In order to achieve the above objective, an operating apparatus for reproducing according to a second viewpoint of the present invention comprises, a discal unit which is rotated by a driving section at a reference rotational speed and in a reference rotational direction, which are predefined, an operation discal unit which is mounted on the discal unit, rotatable with the discal unit, and is configured in such a manner as rotatable in a rotational direction and at a rotational speed as desired by a user, so that a data reproducing apparatus connected externally performs a desired data reproduction, a sensor section which outputs a pulse signal in accordance with the rotational direction and the rotational speed of the operation discal unit, and a control section which determines the rotational direction and the rotational speed of the operation discal unit based on the pulse signal from the sensor section, and controls the driving section so that the discal unit is rotated at a speed higher than the reference rotational speed for a predetermined period of time, when it is determined that the operation discal unit is rotated in the reference rotational direction after pausing for at least a predefined period of time.

According to the present invention as explained in detail in the following, it is possible to provide a reproducing apparatus, an operating apparatus for reproducing and a reproducing method therefor, in which a time from the end of special reproduction of data until restarting the normal reproduction, with keeping pace with a tempo of music, is shortened effectively, thereby fully satisfying the user.

BRIEF DESCRIPTION OF THE DRAWINGS

FIG. 6 is a diagram showing output patterns of a first pulse signal and a second pulse signal in a conventional optical disc reproducing apparatus.

DESCRIPTION OF THE PREFERRED EMBODIMENTS

Hereinafter, an optical disc reproducing apparatus relating to preferred embodiments of the present invention will be explained in detail with reference to the attached drawings. In the following, an explanation will be made with a CD player as a way of example, which is capable of performing a normal reproduction and a special reproduction of audio data recorded on a CD (compact disk), according to a manipulation by a Disc Jockey (hereinafter, referred to as "DJ") for example.

Figure 1:
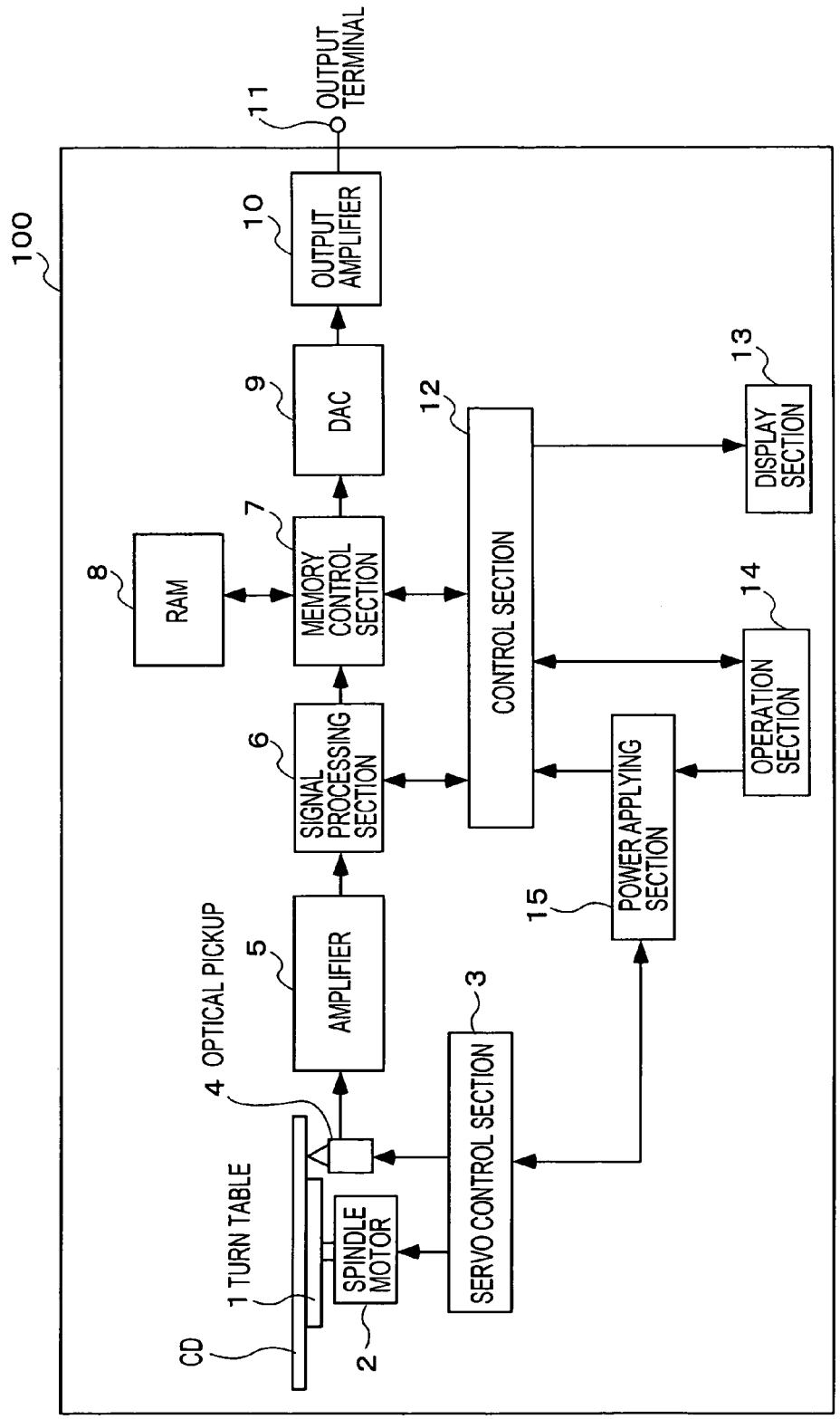
FIG. 1 is a block diagram showing a configuration of the optical disc reproducing apparatus to which an embodiment of the present invention has been applied.

FIG. 1 is a block diagram showing a configuration of the optical disc reproducing apparatus according to one embodiment of the present invention. The optical disc reproducing apparatus 100 as shown in FIG. 1 includes, a turntable 1, a spindle motor 2, a servo control section 3, an optical pickup 4, an amplifier 5, a signal processing section 6, a memory control section 7, RAM (Random Access Memory) 8, DAC (Digital to Analog Converter) 9, an output amplifier 10, an output terminal 11, a control section 12, a display section 13, an operating section 14, and a power applying section 15. In the optical disc reproducing apparatus 100, a CD reproducing portion and a jog dial portion as described below are integrally accommodated in one housing (not illustrated).

On the turntable 1 fixed on the spindle motor 2, a CD on which digital audio data is recorded is mounted in settled manner. The servo control section 3 drives the spindle motor 2 to rotate at a predetermined linear velocity. Further, the servo control section 3 controls a focus servo circuit and a tracking servo circuit (not illustrated) to allow a laser beam from the optical pickup 4 as described below, to accurately trace pit lines on the CD.

The optical pickup 4 reads the digital audio data from the CD in a state of rotating. The digital audio data read by the optical pickup is subjected to waveform shaping and amplified by the amplifier 5, and then, it is inputted to the signal processing section 6. The signal processing section 6 performs a processing such as demodulating the digital audio data, extracting an error signal such as a focus error signal and a tracking error signal, and a synchronized signal, and the like. Then, the digital audio data is outputted to the memory control section 7.

The memory control section 7 stores thus outputted digital audio data in the RAM 8. Further, the memory control section 7 reads the digital audio data stored in the RAM 8, according to an instruction from the control section 12, and outputs the data to the DAC 9. A control according to the control section 12 over the reading speed and reading sequence (reading the audio data in ascending order address or in descending order address) as to the digital audio data stored in the RAM 8 will be described below.

The DAC 9 converts the digital audio data into an analog audio signal, and outputs the converted signal to the output amplifier 10. The analogue audio signal inputted from the DAC 9 is amplified by the output amplifier 10, and is outputted from a speaker and the like connected to the output terminal 11.

The display section 13 includes a liquid crystal display and the like. The display section 13 displays a reproducing time (minute, second, frame) regarding the track currently under reproduction, and also displays attribute information such as a track number. This attribute information is also read as digital data from the CD.

The operating section 14 provides an interface for a user to perform a desired operational input to the optical disc reproducing apparatus 100. The operating section 14 includes, for example, in addition to the jog dial portion as described in detail in the following, a reproducing start button, a reproducing stop button, a setting button for setting a rise time and a pausing time as described below, a designation button for designating a reproducing start time, an eject button and the like.

Figure 2:
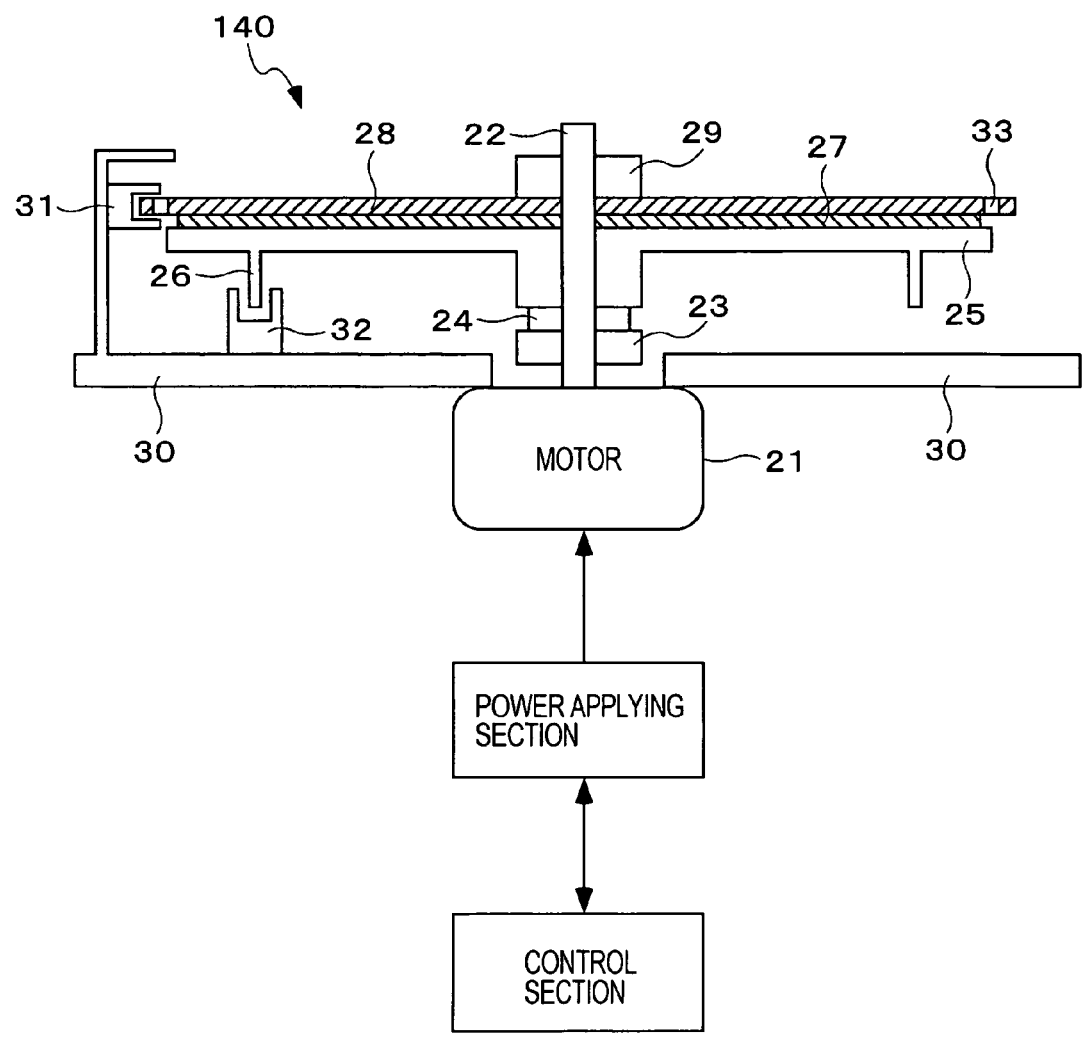
FIG. 2 is a cross sectional view of a jog dial portion relating to an embodiment of the present invention.

FIG. 2 is a cross sectional view showing the jog dial portion 140 according to an embodiment of the invention. The jog dial portion 140 as shown in FIG. 2 includes, a motor 21, a rotating shaft 22, a fixed holding section 23, a holding section 24, a discal unit 25, a slit section 26, a sheet section 27, an operation discal unit 28, a stopper section 29, a panel 30, a first optical sensor section 31, a second optical sensor section 32, and a slit section 33.

The jog dial portion 140 is provided in such a manner as exposed on the top surface of the panel 30, which constitutes the housing of the optical disc reproducing apparatus 100 according to the present embodiment. In the lower part of the panel 30, other elements such as aforementioned turntable 1 and the like are arranged (not illustrated). As described below, a user can implement a desired data reproduction by manipulating the jog dial portion 140 in rotating manner, which is exposed on the surface of the housing.

The motor 21 is fixed on the lower portion of the panel 30. The rotating shaft of the motor 21 is connected to the rotating shaft 22. The discal unit 25 is configured by a member made of aluminum (Al), for example. The fixed holding section 23 is fixed on the rotating shaft 22. The holding section 24 is mounted on the top surface of the fixed holding section 23. The holding section 24 is a member having a large frictional coefficient, and for example, being an elastic body such as rubber.

The motor 21 rotates the discal unit 25 at a reference rotational direction (for example, in clockwise direction) and in a reference rotational speed (for example, angular velocity of the turntable in reproducing by an analogue record player). The reference rotational speed of the discal unit 25 is set to 54 rpm, for example.

The discal unit 25 is provided on the holding section 24. On the under surface of the discal unit 25, the slit section 26 is provided. The slit section 26 is made of, for example, same material as that of the discal unit 25, and is configured by a ring-like plate portion provided nearly perpendicular to the discal unit 25, close to the rim thereof. The slit portion 26 includes, for example, rectangle-shaped openings of even size at even intervals.

The sheet section 27 is provided on the discal unit 25, in such a manner as covering the entire surface thereof. It is preferable that the sheet section 27 is made of a resin material and the like, having a small frictional coefficient and hardly building up static electricity. For example, the sheet section 27 is made of a polyester resin member having a diameter of 164 mm, and a weight of approximately 19 g.

The operation discal unit 28 is mounted on the discal unit 25 via the sheet section 27. For example, the operation discal unit 28 is made of a member of polyvinylchloride resin (PVC), approximately 43 g of weight. The operation discal unit 28 has a diameter larger than that of the discal unit 25, so that the periphery of the operation discal unit 28 is arranged to be in outer side of the edge of the discal unit 25. In the periphery of the operation discal unit 28, the slit sections 33 are provided, each having a rectangle-like shape, and being even size at even intervals. As described below, the user manipulates the operation discal unit 28 in rotating manner to perform a desired operational input.

The stopper section 29 fixes the holding section 24, the discal unit 25, the sheet section 27, and the operation discal unit 28 to the rotating shaft 22.

The operation discal unit 28 is rotatable with the discal unit 25, while at the time of user's rotational manipulation, it is constructed to be rotatable independently in sliding manner on the sheet section 27. That is, the operation discal unit 28 is rotatable integrally with the discal unit 25 according to appropriate resistance generated on the sheet section 27, whereas the operation discal unit 28 is capable of being operated freely in rotating manner by sliding on the sheet section 27 at the time of the user's manipulation.

The first optical sensor section 31 includes two optical sensors, not illustrated, and is fixed on the panel 30 at a position where the slit section 33 can be detected. The optical sensors of the first optical sensor section 31 detect the slit section 33 of the operation discal unit 28, and generate a first pulse signal in accordance with the rotating status (rotational speed and rotational direction) of the operation discal unit 28. Then, the optical sensors output the first pulse signals to the control section 12.

Specifically, the optical sensors generate the first pulse signals at a frequency corresponding to the frequency at which the slit 33 is detected, and the control section 12 determines the rotational speed of the operation discal unit 28 based on the frequency, for example, the number of pulses received within a predetermined period of time. When the rotational direction of the operation discal unit 28 is changed, a phase difference in the pulse signals generated by the two optical sensors respectively is also changed according to the rotational direction of the operation discal unit 28. The control section 12 determines the rotational direction of the operation discal unit 28 based on the phase difference of the two first pulse signals. The control section 12 controls the memory control section 7, so that the digital audio data stored in the RAM 8 is read at a speed and in a sequence according to the signals, in response to the rotational status thus determined as to the operation discal unit 28.

The second optical sensor section 32 includes two optical sensors, which are not illustrated, and are fixed on the panel 30 at a position where a slit of the slit section 26 can be detected. The optical sensors of the second optical section 32 detect the slit of the slit section 26 of the discal unit 25, and generate a second pulse signal corresponding to the rotational status of the discal unit 25. Then, the optical sensors output the second pulse signal to the control section 12. The control section 12 determines the rotational status of the discal unit 25 based on the second pulse signal, in similar manner as the case of the above first pulse signal, and controls the motor 21 so that the rotational speed of the discal unit 25 is maintained at a predetermined rotational speed.

Here referring to FIG. 1 again, the power applying section 15 applies a predetermined value of voltage to the motor 21 for a predetermined period of time. When the control section 12 determines that the operation discal unit 28 restarts rotating in the reference rotational direction after a pause for at least a predetermined period of time, the control section 12 controls the power applying section 15 to apply a predetermined voltage to the motor 21.

The control section 12 monitors the intervals between the inputs of the first pulse signals and determines based on the intervals that the operation discal unit 28 has paused for at least the predetermined period of time. The control section 12 has a timer such as a software timer, and monitors the intervals between the inputs of the first pulse signals. If a status where the intervals are at least a predetermined period of time continues for the predetermined period of time or more, the control section 12 determines that the operation discal unit 28 has paused for at least the predetermined period of time.

For example, here it is assumed a situation where first pulse signals have not been inputted from the first optical pulse sensor section 31 for at least a constant period of time (e.g., 0.4 msec), continues for at least a constant period of time (e.g., 20 msec). After this situation, if the control section 12 receives a first signal pulse signal indicating a rotation of the operation discal unit 28 in the reference rotational direction, the control section 12 determines that the operation discal unit 28 restarts rotating, and the control section 12 outputs an application instructing signal to the power applying section 15. Upon receipt of the application instruction signal from the control section 12, the power applying section 15 applies a predetermined value of voltage (e.g., 8V) to the motor 21, for a predetermined period of time (e.g., 0.2 msec, 20 msec), in addition to the voltage value currently applied. At this moment, the rotational speed of the discal unit 25 is increased, and it rotates at a speed higher than the reference rotational speed temporarily. Accordingly, as described below, the time required for the operation discal unit 28 to reach the reference rotational speed from the pausing status is shortened effectively.

In the following, an operation of the optical disc reproducing apparatus 100 having the construction as described above will be explained, as to a case where a special reproduction is performed. It is to be noted that in the following example, a speed for reading the digital audio data from the RAM 8 when the operation discal unit 28 rotates at the reference rotational speed is referred to as a reference reading speed (a reading speed at the time of normal reproduction). A sequence for reading the digital audio data from the RAM 8 when the operation discal unit 28 rotates in the reference rotational direction is referred to as a reference reading sequence (a reading sequence at the time of normal reproduction).

First of all, an operation of the optical disc reproducing apparatus 100 in the case where a user performs the special reproduction, in particular, a manipulation for stopping the reproduction.

Firstly, a user puts his or her hand on the operation discal unit 28 rotating at the reference rotational speed and in the reference rotational direction, so as to make the rotational speed gradually slower. At this moment, the discal unit 25 continues rotating at the reference rotational speed without influenced by the rotation of the operation discal unit 28, since the frictional coefficient of the sheet section 27 is small. As the rotational speed of the operation discal unit 28 becomes slower, the number of pulses of the first pulse signal generated from the first optical sensor section 31 for a constant period of time is decreased in accordance with the rotational speed of the operation discal unit 28. The control section 12 determines the rotational speed of the operation discal unit 28 based on the number of pulses of the first pulse signal, which have been received from the first optical sensor 31 during a constant period of time. The control section 12 controls the memory control section 7 so as to make the speed for reading the digital audio data from the RAM 8 slower in accordance with the rotational speed thus determined.

When the rotation of the operation discal unit 28 is stopped, the first optical sensor section 31 does not output the first pulse signal to the control section 12. When received no input of the first pulse signal from the first optical sensor section 31, the control section 12 controls the memory control section 7 to stop reading the digital audio data from the RAM 8.

Next, an operation of the optical disc reproducing apparatus will be explained, as to the case where the user performs the special reproduction, in particular, manipulation for reproducing in reverse sequence.

The user manually rotates the operation discal unit 28 in reverse direction (in anticlockwise), which has been rotating at the reference rotational speed and in the reference rotational direction. At this moment, the discal unit 25 continues rotating at the reference rotational speed and in the reference rotational direction, without influenced by the rotational speed and the rotational direction of the operation discal unit 28, since the frictional coefficient of the sheet section 27 is small. The control section 12 determines the rotational speed of the operation discal unit 28 based on the number of pulses of the first pulse signal, which have been inputted from the first optical sensor 31 for a constant period of time. Further, the control section 12 determines a rotational direction of the operation discal unit 28 based on a phase difference between two of the first pulse signals as described above. The control section 12 controls via the memory control section 7, the speed and the sequence for reading the audio data from the RAM 8, according to the rotational speed and the rotational direction thus determined.

On the other hand, if the user rotates the operation discal unit 28 in a forward direction (reference rotational direction)

at a speed higher than the reference rotational speed, the control section 12 determines the rotational speed, and controls the memory control section 7 so as to read the audio data from the RAM 8 at a speed in accordance with the rotational speed thus determined.

When a so-called scratch reproduction is performed by use of the optical disc reproducing apparatus, the user repeats the operation described above, that is, the operation to rotate the operation discal unit 28 rapidly in forward direction or in reverse direction, or to stop the rotation. The control section 12 determines the rotational speed and the rotational direction of the operation discal unit 28, and controls the memory control section 7 in accordance with the rotational speed and the rotational direction thus determined. The control section 12 controls via the memory control section 7, the reading speed and the reading sequence (reading the audio data in ascending order address or in descending order address) as to the digital audio data stored in the RAM 8. The digital audio data read out from the RAM 8 is converted to the analogue audio signal by the DAC 9, amplified by the output amplifier 10, and outputted from a speaker connected to the output terminal 11, as an effective sound like a scratch sound.

As described above, by manipulating the operation discal unit 28 in rotating manner, the user can perform the normal reproduction and the special reproduction such as scratch reproduction, as desired.

Here, in the present embodiment, the time required for changing from the special reproduction status to the normal reproduction status is shortened effectively. Hereinafter, detailed explanations will be made. When the user completes the special reproduction and moves his or her hand off the operation discal unit 28, the operation discal unit 28 starts to follow the rotation of the discal unit 25, while sliding on the surface of the sheet section 27 and increasing the rotational speed gradually from the pausing status. Therefore, a certain period of time is required for the operation discal unit 28 to reach the reference rotational speed from the pausing status. During this time period, the optical disc reproducing apparatus conducts a reading control at a low speed, in accordance with the rotational speed of the operation discal unit 28. Since such a low speed reading during this period of time is not intended by the user, and there may be a case that the tempo of music goes out of tune. Therefore, it is preferable to make this period of time as short as possible.

In the optical disc reproducing apparatus 100 relating to the present embodiment, the discal unit 25 is rotated at a speed higher than the reference rotational speed, during a predetermined period of time after the operation discal unit 28 is rotated in reverse direction until the rotational speed reaches the reference rotational speed. Accordingly, the time required for the rotation of the operational discal unit 28 to reach the reference speed can be shortened effectively, since the operation discal unit 28 is given a turning force by the discal unit 25.

Specifically, the control section 12 detects timing when the operation discal unit 28 restarts the rotation after a pausing status is ended. Here, the pausing status indicates such a status in that after the user completes the rotational manipulation in reverse direction, actually moves his or her hand off the operation discal unit 28, the operation discal unit 28 pauses for a while until it restarts the rotation. When detected the timing, the control section 12 controls to increase the rotational speed of the discal unit 25. For example, when the control section 12 receives a first pulse signal indicating a rotation of the operation discal unit 28 in the reference rotational direction, after a state where the first pulse signal has not been inputted from the first optical sensor section 31 (i.e., there has been no rotational operation by the user) for 40 msec or more, for example, the control section 12 outputs an application instructing signal to the power applying section 15.

Upon receipt of the application instructing signal from the control section 12, the power applying section 15 applies to the motor 21, a predetermined voltage value, for example 8V, for a time period, for example 20 msec. The motor 21 temporarily accelerates the rotation, by the power thus applied from the power applying section 15, and when the power application is completed, it is rotated at the reference rotational speed.

When the rotation of the operation discal unit 28 coincides with that of the discal unit 25, the control section 12 determines that the operation discal unit 28 rotates at the reference speed and in the reference direction, based on the first pulse signal received from the first optical sensor section 31. At this moment, the control section 12 controls the memory control section 7 to read the digital audio data from the RAM 8, at the reference reading speed and in the reference reading sequence as in the case of normal reproduction.

Figure 3:
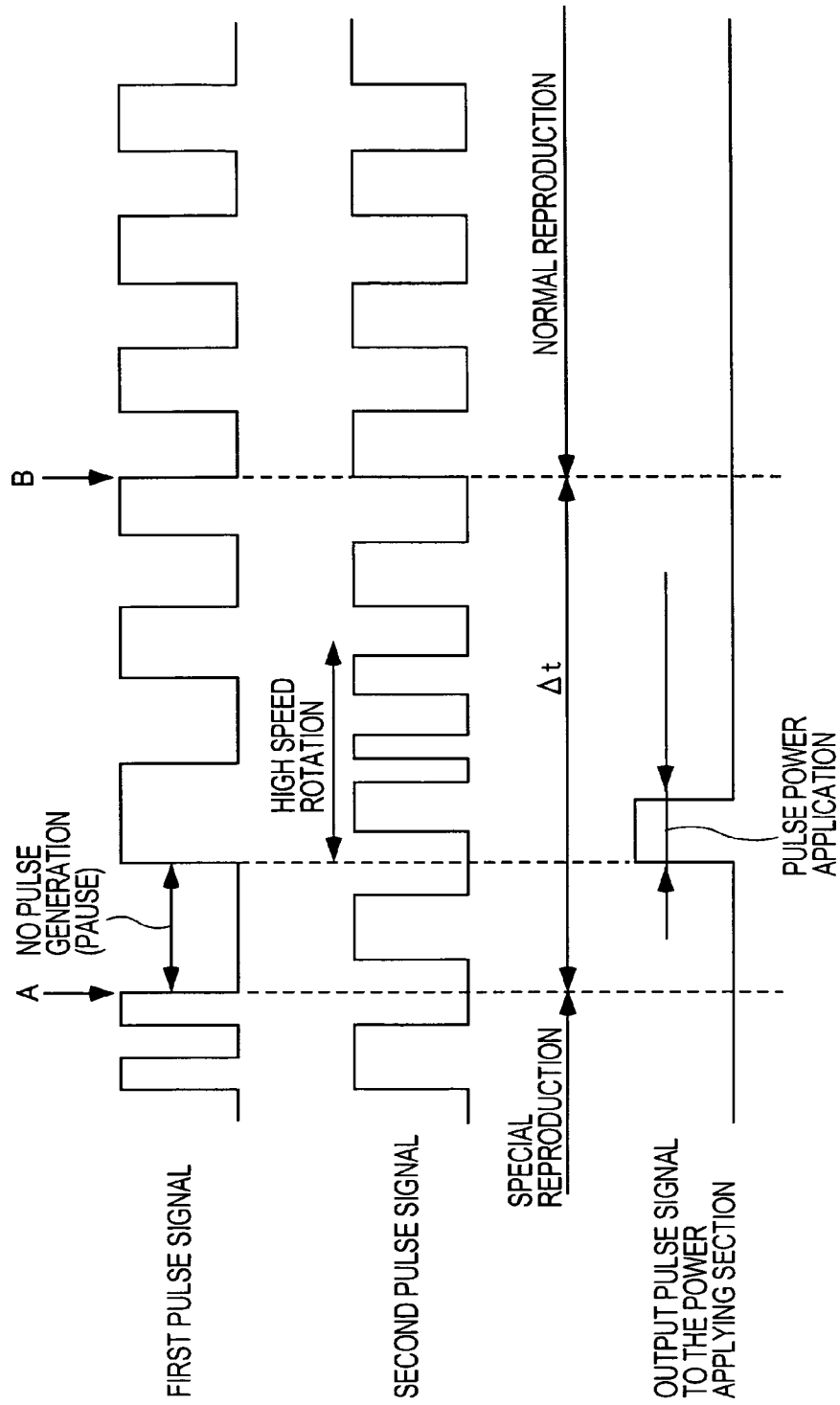
FIG. 3 is a diagram showing output patterns of a first pulse signal, a second pulse signal and a pulse voltage applied to a motor in an embodiment of the present invention.

FIG. 3 is a diagram showing the first pulse signal outputted from the first optical sensor section 31, the second pulse signal outputted from the second optical sensor section 32, and the power pulse signal outputted to the motor 21 from the power applying section 15. It is to be noted that two signals are included in the first pulse signal and the second pulse signal respectively, but one of the two signals is shown in FIG. 3.

As shown in FIG. 3, the operation discal unit 28 is in pausing status, from the time when the user completes the scratch reproduction (A) and then the user's hand is actually moved off the operation discal unit 28, until the time when it starts rotating following the rotation of the discal unit 25. During this pausing period, the first optical sensor 31 does not generate the first pulse signal. Subsequently, the operation discal unit 28 having been in pausing status starts to rotate in the reference rotational direction, while sliding on the surface of the sheet section 27. When the control section 12 receives the first pulse signal indicating the rotation of the operation discal unit 28 in the reference rotational direction, after a state where the first pulse signal from the first optical sensor section 31 has not been received, for example, for 40 msec, the control section 12 outputs the application instructing signal to the power applying section 15. The power applying section 15 applies to the motor 21 the power of voltage value 4 V, for example, for a period of 20 msec.

The rotation of the motor 21 is temporarily accelerated by the power additionally applied from the power applying section 15, and accordingly the rotation of the discal unit 25 is also temporarily accelerated. When the rotation of the discal unit 25 is temporarily accelerated in a state that the operation discal unit 28 starts rotating while accelerating by sliding on the surface of the sheet section 27, the rotational speed of the operation discal unit 28 is increased significantly. Accordingly, the operation discal unit 28 is capable of reaching the reference rotational speed, within a short period of time in effect, comparing the case where the discal unit 25 is not temporarily accelerated.

When the rotational speed of the operation discal unit 28 reaches the reference rotational speed, the first optical sensor section 31 outputs the first pulse signal at intervals indicating the reference rotational speed and reference rotational direction, which are same as those of the second pulse signal outputted from the second optical sensor section 32. Based on the first signal, the control section 12 determines that the operation discal unit 28 is rotating at the reference rotational speed and in the reference rotational direction. For example, the control section 21 compares the first pulse signals and the second pulse signals, and when the first pulse signals are inputted at the intervals identical to those of the second pulse signals, it determines that the operation discal unit 28 is rotating at the reference rotational speed and in the reference rotational direction. At this moment, the control section 12 controls the memory control section 7 so as to perform the normal reproduction at the point of B as shown in FIG. 3. According to the present embodiment, the time period $\Delta t$ from the point A where the user ends the special reproduction up to the point B where the normal reproduction is restarted is made to be shorter effectively than the time period $\Delta t_0$ in the case where the rotation of the discal unit 25 is not accelerated as shown in FIG. 6.

For example, in the case where the reference rotational speed is 54 rpm, the time period from the end of the special reproduction to the restart of the normal reproduction is approximately 170 msec, if the power applying section 15 does not apply a voltage when the operation discal unit 28 restarts rotating in the reference rotational direction. However, if the power applying section 15 applies voltage of 8 V to the motor 21 for a time period of 20 msec, the time period from the end of the special reproduction to the restart of the normal reproduction is approximately 80 msec. Therefore, it is understood that according to the voltage application, the time can be shortened by approximately 90 msec.

As described above, in the optical disc reproducing apparatus 100 according to the present embodiment, when the operation discal unit 28 restarts the rotation in the reference rotational direction after the pausing status, the rotation of the discal unit 25 is temporarily accelerated and then it is rotated at a high speed, thereby significantly increasing the acceleration of the rotation of the operation discal unit 28. Then, the time period required from the end of the special reproduction by the user up to the restart of the normal reproduction is shortened effectively.

Therefore, according to the optical disc reproducing apparatus of the present embodiment, when a user completes the special reproduction and restarts the normal reproduction, it is made easier for the user to restart the normal reproduction, with keeping pace with the tempo of music, thereby enhancing the degree of satisfaction of the user.

The present invention is not limited to the embodiment as described above, but various modifications are possible.

In the embodiment described above, when the operation discal unit 28 is stopped, the first pulse signal is not generated for 40 msec or more, for example, and then a forward rotation of the operation discal unit 28 is detected, the voltage, for example 8 V, is applied to the motor 21, for the time period of 20 msec, for example. However, the time period and the voltage are not limited to the above example, and they can be appropriately selected in accordance with the reference rotational speed, the material, weight, and so on of the discal unit 25 and the like.

Further in the embodiment as described above, the voltage applying section 15 applies a pulse voltage once to the motor 21. However, the present invention is not limited to this, and two or more pulses may be applied intermittently. In this case, for example, a plurality of pulse voltages may be applied so that the voltage value and/or the pulse width are decreased gradually.

Furthermore, the timing when the control section 12 instructs the voltage applying section 15 to apply voltage is not limited to the above example. For example, the control section 12 stores a standard output pattern or a phase change pattern of the first pulse signal, which indicates the rotational status of the operation discal unit 28, from the special reproduction to the normal reproduction. Then, it is possible to apply voltage when a pattern of the first pulse signal received from the first optical sensor 31 coincides with the pattern thus stored.

Further in the embodiment as described above, the control section 12 applies voltage to the motor 21 via the voltage applying section 15. However, the control section 12 may directly control the motor 21, so that the rotational speed of the motor is adjusted to be rotated at a high speed temporarily.

Figure 4:
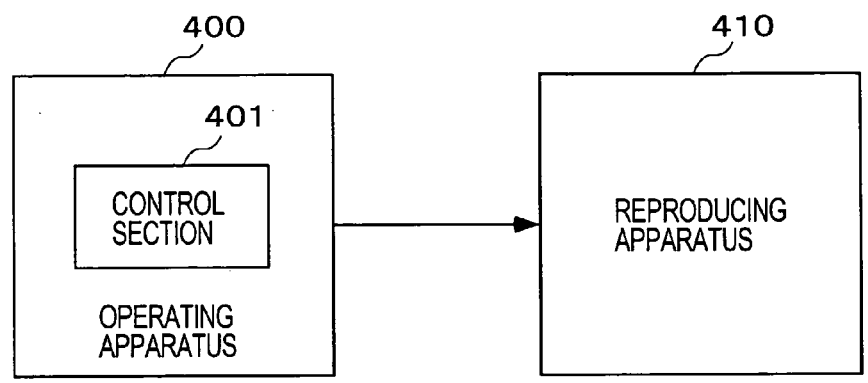
FIG. 4 is a diagram showing a modified example of an embodiment of the present invention.
Figure 5:
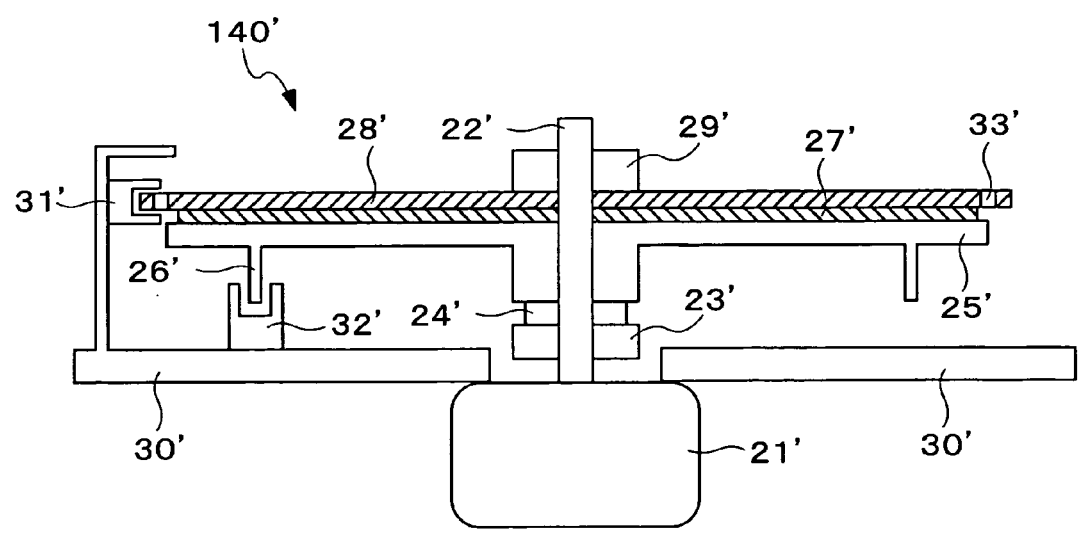
FIG. 5 is a diagram showing a configuration of a jog dial portion in a conventional optical disc reproducing apparatus.

Further in the embodiment as described above, a construction in which the operating section 14 and a reading section such as the optical pickup 4 are integrally provided has been explained. However, the present invention is not limited to this, and the operating section and the reading section may be configured separately. For example, as shown in FIG. 4, it is possible to operate a reproducing apparatus 410 (normal operation and special operation), via an operating apparatus 400 connected thereto, which has a construction similar to the operating section 14. In this case, for example, when the control section 401 of the operating apparatus 400 detects an operational input from a user, the control section 401 sends to the reproducing apparatus 410 a control signal for the special reproducing operation as described above. Accordingly, it is possible for the user to allow the reproducing apparatus 410 to perform a desired data reproduction, via the operating apparatus 400.

In the embodiment as described above, a CD player for reproducing audio data recorded on a CD has been explained as an example. However, the present invention can be applied to any type of apparatus which performs a reproduction of data recorded on an optical disc. For example, it can be applied to an apparatus which reproduces image data recorded on a DVD (Digital Versatile Disc). In this case, the image data normally reproduced or specially reproduced may be outputted to a display, a projector for home theater use and the like.

Furthermore, as shown in FIG. 4, if the operating section 400 is constructed as an independent device, it may be connected to a reproducing apparatus for other magnetic and/or optical recording medium such as a magnetic disc. Accordingly, it is possible to construct such that reproducing is made from the recording medium and a user manipulates reading and outputting of data stored in the memory.

While the preferred embodiments of the present invention have been illustrated in detail, it should be apparent that modifications and adaptations to those embodiments may occur to one skilled in the art without departing from the scope of the present invention as set for the in the following claims.

The disclosure of Japanese Patent Application Nos. JP 2003-341221 filed on Sep. 30, 2003, JP 2003-387843 filed on Nov. 18, 2003, and JP 2004-020169 filed on Jan. 28, 2004, including the specification, drawings and abstract are incorporated herein by reference in their entirety.

What is claimed is:

1. A reproducing apparatus comprising:
   a reading section which reads data recorded on a recording medium;
   a storing section which stores the data read by said reading section;
   a reproducing section which reads out and reproduces the data stored in said storing section;

a discal unit which is rotated by a driving section at a reference rotational speed and in a reference rotational direction;

an operation discal unit which is mounted on said discal unit to be rotatable with said discal unit, and is configured in such a manner as being rotatable in a rotational direction and at a rotational speed as desired by a user, so that said reproducing section performs a desired data reproduction;

a sensor section which outputs a pulse signal in accordance with the rotational direction and the rotational speed of said operation discal unit; and a control section which determines the rotational direction and rotational speed of said operation discal unit according to the pulse signal from said sensor section, and when determines that said operation discal unit starts rotating in said reference direction after pausing for at least a predetermined period of time, said control section controls said driving section to rotate said discal unit at a speed higher than said reference rotational speed for a predetermined period of time.

2. The reproducing apparatus according to claim 1, wherein, said control section gives a control to apply to said driving section a pulse voltage of a predetermined voltage value, so that said discal unit is rotated at a higher speed.

3. An operating apparatus for reproduction comprising:

a discal unit which is rotated by a driving section at a reference rotational speed and in a reference rotational direction;

an operation discal unit which is mounted on said discal unit to be rotatable with said discal unit, and is configured in such a manner as being rotatable in a rotational direction and at a rotational speed as desired by a user, so that a data reproducing apparatus connected externally performs a desired data reproduction;

a sensor section which outputs a pulse signal in accordance with the rotational direction and the rotational speed of said operation discal unit; and a control section which determines the rotational direction and the rotational speed of said operation discal unit based on the pulse signal from said sensor section, and when determines that said operation discal unit starts rotating in said reference rotational direction after pausing for at least a predefined period of time, said control section controls said driving section to rotate said discal unit at a speed higher than said reference rotational speed for a predetermined period of time.

4. The operating apparatus for reproduction according to claim 3, wherein, said control section gives a control to apply to said driving section a pulse voltage of a predetermined voltage value, so that said discal unit is rotated at a higher speed.

5. A reproducing method in a reproducing apparatus having a reading section which reads data recorded on a recording medium, a storing section which stores the data read by said reading section, a reproducing section which reads out and reproduces the data stored in said storing section, and a discal unit which is rotated by a driving section at a reference rotational speed and in a reference rotational direction, comprising:

receiving an instruction from a user regarding a reproducing sequence direction and a reproducing speed of the data, via an operation discal unit, which is mounted on said discal unit to be rotatable with said discal unit, and is configured in such a manner as being rotatable in a rotational direction at a rotational speed as desired by the user;

receiving a pulse signal outputted according to the rotational direction and the rotational speed of said operation discal unit which rotates according to the received instruction;

determining the rotational direction and rotational speed of said operation discal unit according to said received pulse signal; and controlling a reproduction in said reproducing section in accordance with said rotational direction and rotational speed thus determined, and when determines that said operation discal unit starts rotating in said reference direction after pausing for at least a predefined period of time, controlling said driving section to rotate said discal unit at a speed higher than said reference rotational speed for a predetermined period of time.

6. The reproducing method according to claim 5, wherein, when determined that said operation discal unit starts rotating in said reference rotational direction after pausing for at least a predetermined period of time, said controlling includes applying to said driving section a pulse voltage of a predetermined voltage value, so that said discal unit is rotated at a high speed.

* * * * *